April 11, 1944.                J. P. JOHNSON                2,346,435
                                 SEPARATOR
                           Filed April 4, 1941         2 Sheets-Sheet 1
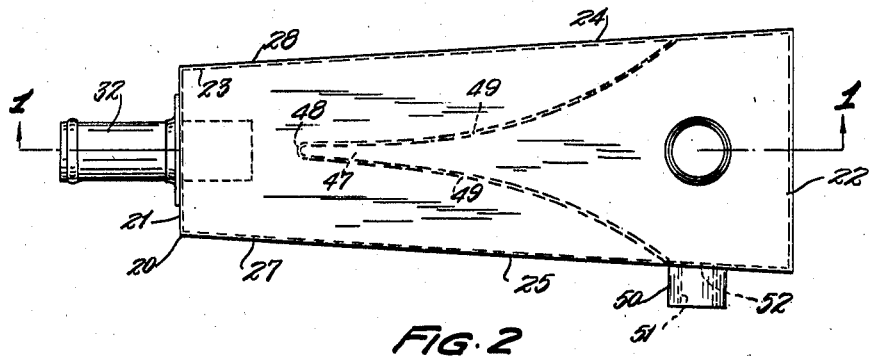
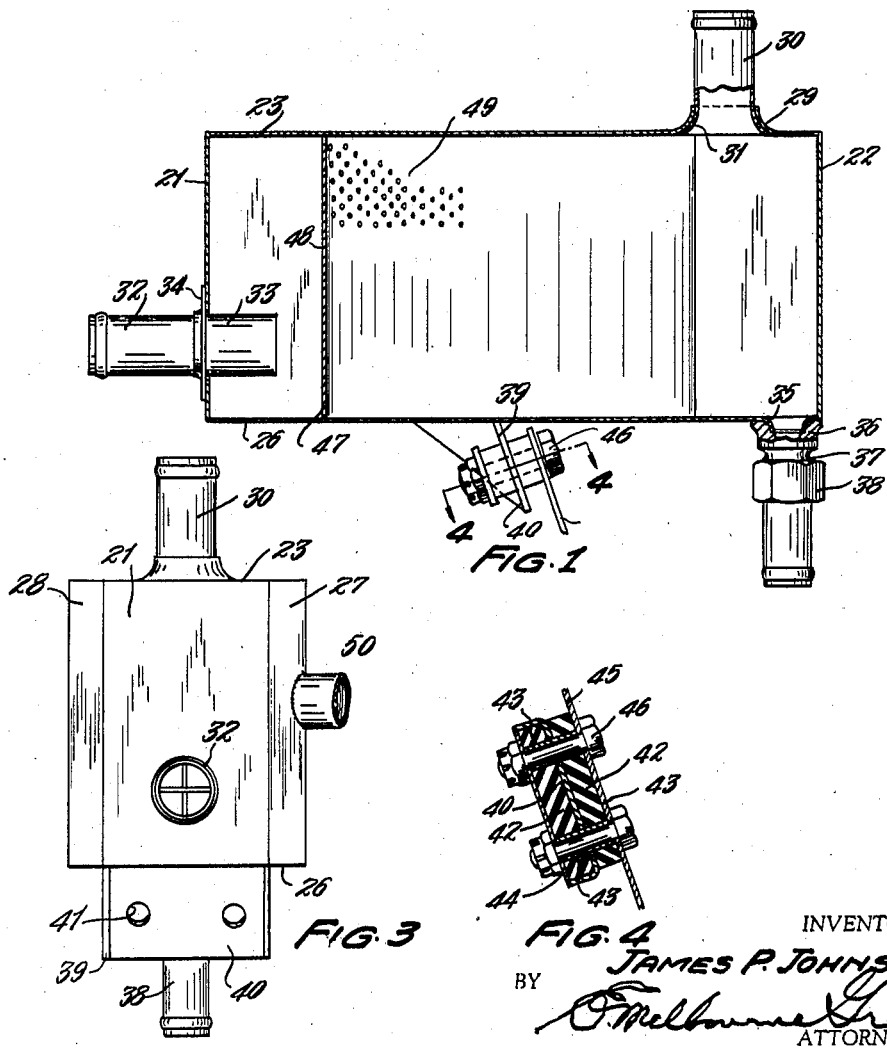

April 11, 1944. J. P. JOHNSON 2,346,435
SEPARATOR
Filed April 4, 1941 2 Sheets-Sheet 2

INVENTOR.
JAMES P. JOHNSON
BY
ATTORNEY.

Patented Apr. 11, 1944

2,346,435

UNITED STATES PATENT OFFICE 2,346,435

SEPARATOR

James P. Johnson, Shaker Heights, Ohio

Application April 4, 1941, Serial No. 386,774

4 Claims. (Cl. 183—109)

This invention relates to oil separators and more particularly to one designed especially for use on aircraft although the novel features may be otherwise adapted by those skilled in the art.

An object of the present invention is to provide an improved oil separator of compact light weight construction, highly efficient in separation of oil from oil ladened air and one which has no movable parts thus eliminating wear and replacements.

Another object of the present invention is to provide a fluid tight container having an oil filtering means so formed and disposed with respect to the incoming oil ladened air that the latter is divided into two or more swirling streams thus throwing the oil particles against the filtering means through which the oil passes and is subsequently recovered and returned to the engine crank-case or other reservoir for further use.

Another object of the present invention is to form the oil filtering means in such a manner that its effective area is greatly enlarged thereby reducing the velocity of the incoming oil ladened air to allow the oil particles to adhere to the means and filter more rapidly through the latter.

Another object of the present invention is to position the filtering means at a relatively small angle with respect to the path of the introduced oil ladened air whereby back pressure is reduced to a negligible quantity.

Another object of the present invention is to provide an oil separator which is simple in construction, efficient in operation, and inexpensive to manufacture.

With the objects above indicated, and other objects hereinafter explained in view, my invention consists in the construction and combination of elements hereinafter described and claimed.

Referring to the drawings,

Figure 1 is a longitudinal vertical sectional view taken along line 1—1 in Figure 2 and showing a separator embodying the present invention.

Figure 2 is a top plan view of the separator illustrated in Figure 1 and showing further details of the invention.

Figure 3 is an end elevational view of the separator looking at the inlet side.

Figure 4 is a transverse sectional view taken on line 4—4 in Figure 1 and showing details of the mounting flange connection.

Figure 6:
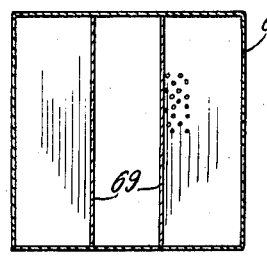
Figure 6 is a transverse sectional view taken along line 6—6 in Figure 5.

In the drawings I have illustrated an oil separator embodying the present invention and, while the novel features may be otherwise adapted, the separator has special adaptation for use on aircraft. At the present time vacuum pumps are designed to have a predetermined suction at the inlet side for operation of certain well known instruments and is further capable of developing a predetermined discharge pressure sufficient for suitable operation of de-icer apparatus when used. The vacuum pump requires, for efficient operation, a suitable lubricant which becomes mixed with the discharged air and the transmission of this oil to the rubber de-icer apparatus would result in serious disintegration of the latter. The present separator is preferably introduced between the vacuum pump and the de-icer apparatus and functions to remove substantially all of the oil particles from the air stream in a manner to be later described. To emphasize the efficiency of the separator with respect to its size the separator shown is approximately three-quarter size.

The separator comprises a hollow container 20 preferably made from low brass thin sheet material. The container includes a front end wall 21 vertically disposed and a rear end wall 22 spaced longitudinally therefrom but in parallel relation. A top wall 23 extends between the front and rear walls 21 and 22 and is disposed horizontally at right angles with respect to the adjacent end walls. The top wall 23 has tapered sides 24 and 25 which extend divergingly between the front and rear walls respectively. A bottom wall 26, similar to the top wall 23, is disposed in horizontally spaced relation beneath the latter and extends between the front and rear walls adjacent the lower ends thereof as more clearly shown in Figure 2. Relatively spaced side walls 27 and 28 extend between the front and rear walls in a vertical position and between the top and bottom walls along the angularly disposed edges. The manner of forming this container is of no material importance as many different and well known methods may be employed but by whatever manner it is formed all connecting edges or joints must be either brazed or soldered and if the latter preferably with silver solder. It is important, however, that the container be fluid tight when subjected to pressure internally or externally in order to maintain its efficiency.

The top wall 23, adjacent the rear wall 22, is provided with a centrally disposed transversely extending opening surrounded by an outwardly projecting annular flange 29 as more clearly shown in Figures 1 and 2. A short section of brass tubing 30 projects outwardly from the opening in the top wall and has its lower edge flared outwardly at 31 for cooperative engagement with the inner face of the flange 29. These cooperating flanges 29 and 31 should, likewise, be soldered or brazed to afford a rigid seal. This tubular member 30 has a relatively large cross-section unrestricted to the flow of air and is adapted for connection with a de-icer apparatus when the same is being used upon the plane or to the slip stream. The front wall 21 has a similar centrally disposed opening adjacent its lower portion within which a tubular member 32 is disposed but in this case the inner end of the tube projects inwardly at 33 for a substantial distance beyond the wall. A mounting flange 34 encircles the tube 32 and is secured to the adjacent portion of the end wall 21 as well as to the adjacent portion of the tube by brazing or soldering. This tube, likewise, is of substantial size and preferably of the diameter of the tube 30, the tubes being disposed relatively at right angles, the outer end of the tube 32 being adapted for connection with the discharge side of a vacuum pump. The bottom wall 26, adjacent the rear wall, is provided with a centrally disposed opening having an outwardly extending annular flange 35 to which is secured an oil outlet tube 36 having an exteriorly screw-threaded end 37, the tube 36 being connected to the flange by brazing or soldering as desired. A nipple 38 has an interiorly screwthreaded bore at one end mounted on the screwthreaded end of the outlet tube and a suitable gasket, not shown, forms a sealed connection therebetween. A strainer, not shown, may be removably mounted between the free end of the outlet tube and the nipple for preventing passage of any foreign matter. To the free end of the nipple 38, a conduit, not shown, may be attached which connects with the engine crank-case or other suitable oil reservoir. It is important that this line slope downwardly toward the engine to prevent oil trapping and likewise, the bottom wall 26 of the container should be disposed at an angle of approximately 20 degrees to the horizontal when the plane is in flying position. To attach the separator to the plane, or other supporting structure, a mounting bracket 39 is provided on the bottom wall 26 adjacent its central portion and has a depending channel-shaped flange 40 projecting downwardly at an angle, from inlet to outlet, of approximately 20 degrees with respect to a vertical plane. The flange 40 is provided with openings 41 in transverse alignment by means of which the separator can be suitably connected to the supporting structure. Preferably, however, a pair of resilient non-metallic blocks 42, of neoprene compound or similar material, are disposed on opposite sides of the flange 40 and have openings in axial alignment with the openings 41. Spacer tubes 43 extend through the aligned openings and terminate slightly short of the outer opposite faces of the blocks 42. A plate 44 is disposed in engagement with the outer face of one of the blocks 42 and slidably fits between the lateral ends of the flange 40, being provided with openings in axial alignment with the tubes 43. A mounting flange 45 on the supporting structure has a projecting end portion disposed in engagement with the outer face of the opposite block 42 and is likewise provided with openings in axial alignment with the tubes. Bolts 46 have their shanks extending through the tubes 43 and the aligned openings in said plate and mounting flange and nuts are detachably mounted thereon for effectively securing the elements in assembled relation.

An oil filtering member 47 is disposed transversely within the container 20 thus separating the inlet opening 32 from the air and oil outlet openings 30 and 36 respectively whereby the incoming fluid is required to pass through the filtering member. The filtering means shown in my prior Patent No. 2,227,501, granted January 7, 1941, is particularly efficient and has been favorably received by the industry, but it has certain undesirable characteristics such as the presence of too high back pressure, too great a velocity, and its limitation with respect to effective filtering surface, any or all of which are primary considerations in aircraft adoption. Maximum sizes and weights of accessories used on aircraft are well standardized and improvements in efficiency and operation under such conditions are of great importance. Greater efficiency in the present instance is obtained by forming the filtering member 47 in substantially V-shape in plan with its closed end or nose 48 disposed adjacent the inner tubular portion 33 of the inlet tube 32 as more clearly shown in Figure 2. The filtering member 47 is preferably made of #22 gage brass sheet material numerously perforated with small holes approximately .033 inch in diameter, there being substantially 225 such holes to the square inch and preferably arranged in staggered relation. The closed end 48, of the V-shaped member 47, is rounded on a small radius, approximately $\frac{1}{16}$ inch, and the opposite sides 49 each extend rearwardly therefrom in a long gradual outwardly curved manner terminating at a plane extending transversely at the forward portion of the air outlet opening 30 and engageable respectively with the adjacent side walls 27 and 28. The filtering member 47, in the present instance, is approximately $3\frac{13}{16}$ inches long and in height extends continuously between the top and bottom walls 23 and 26 respectively as more clearly shown in Figure 1. The best results have been obtained by forming the side 49, of the V-shaped member 47, about a 12¼ inch radius adjacent the closed end 48 and a 3½ inch radius adjacent the free end, the two being relatively disposed to afford a continuously smooth curved surface. The filtering member may be secured against accidental displacement in any suitable manner but preferably by brazing or soldering the top and bottom of the nose 48 to the adjacent portions of the top and bottom walls 23 and 26 respectively while the free ends are similarly secured to the adjacent portions of the side walls 24 and 25 respectively. This arrangement separates the inlet opening from the air and oil outlet openings, the only means of communication being the multiplicity of openings in the filtering member through which the fluid must pass.

The closed end 48 of the filtering member is disposed perpendicularly within the container in longitudinal alignment with the vertical axis of the inlet opening but spaced suitably inwardly from the inner end portion 33 as more clearly shown in Figures 1 and 2. This positioning and shaping of the filtering member causes the incoming fluid to be divided into two swirling streams the relative velocity of which is materially reduced due to the greatly enlarged effective area of the filtering member. As the oil particles are deposited upon the filtering member they tend to adhere thereto and pass through the perforations to the opposite side where they trickle down the vertical sides to the bottom of the container. The air, substantially oil freed, also passes through the perforations and is discharged under pressure through the air outlet opening 30. The back pressure in the container is materially reduced by maintaining a relatively small angle between the curved sides of the filtering member and the path of the incoming fluid. The separated or freed oil on the bottom of the container flows toward the oil outlet opening 36 and passes therethrough where it is conveyed back to the engine crank-case or other suitable reservoir for further use.

If desirable, the interior of the container may be connected with a pressure gauge to indicate the pressure therein thus insuring against the presence of excessive pressure. In this case the side wall 27 has a lateral extension 50 brazed or soldered thereto, the extension being positioned beyond the adjacent free end of the filtering member as more clearly shown in Figure 2. The extension 50 has an interiorly screwthreaded bore 51 extending inwardly from its outer end which communicates with an axial opening 52 extending through the side wall thus affording communication with the interior of the container. This extension can be connected with a pressure gauge, or if a pressure gauge is not desirable the opening may be closed by the use of a screw-threaded plug, not shown.

Figure 5:
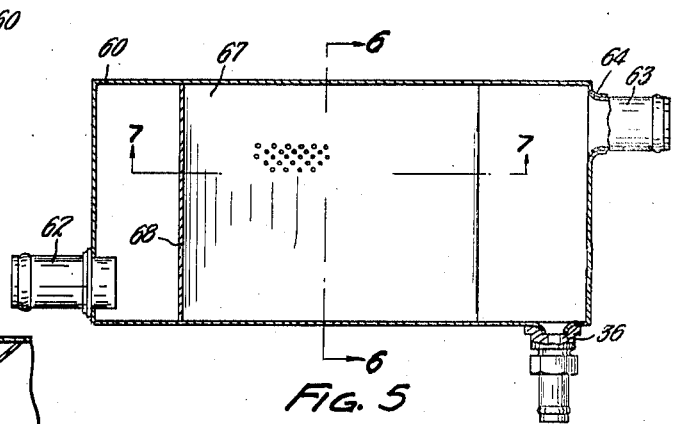
Figure 5 is a longitudinal vertical sectional view of a modified form of separator embodying the invention.
Figure 7:
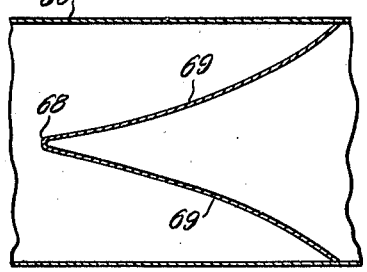
Figure 7 is a fragmentary transverse sectional view taken along line 7—7 in Figure 5.

In the modification shown in Figures 5, 6, and 7, the container 60 is made fluid tight in the same manner as heretofore described but the container is substantially square in cross-section as more clearly shown in Figure 6. The inlet tube 62 is similarly mounted in an opening on the forward end wall at the lower portion thereof while the air outlet tube 63 is mounted in a flanged opening 64 provided in the opposite end wall adjacent the upper portion thereof. The oil outlet tube 36 is mounted upon the bottom wall at the rear end in the same manner as that shown in Figure 1. The filtering member 67 is of substantially the same shape as the filtering member 47 and has its closed end 68 rounded on a small radius and its opposite sides 69 each extending rearwardly therefrom in a long gradual outwardly curved manner terminating in a plane extending transversely inwardly from the end of the container and engageable respectively with the adjacent side walls as more clearly shown in Figure 7. The filtering member is secured against displacement in any suitable manner and is provided with perforations similar to those heretofore described in connection with the filtering member 47. The filtering member 67 is disposed perpendicularly within the container and has its closed end in longitudinal alignment with the vertical axis of the inlet opening being spaced suitably inwardly from the inner end of the inlet tube. Here again, the incoming fluid is divided into two swirling streams, the oil particles of which are separated from the air in the manner heretofore described.

Figure 8:
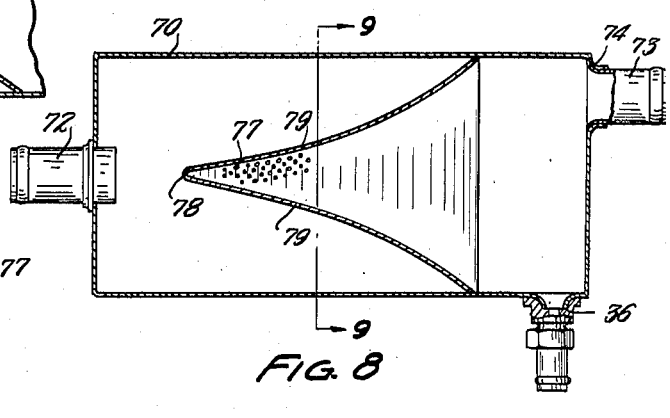
Figure 8 is a longitudinal vertical sectional view of a further modified form of separator embodying the invention.
Figure 9:
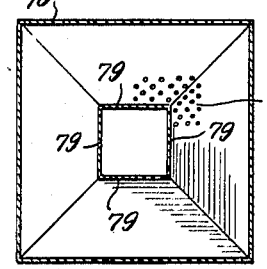
Figure 9 is a transverse sectional view taken along line 9—9 in Figure 8.

The modification illustrated in Figures 8 and 9 show a fluid tight container 70 of substantially square cross-section having an inlet tube 72 suitably mounted in an opening provided in the forward end wall of the container and in this instance on its longitudinal axis. An air outlet tube 73 is mounted in a flanged opening 74 provided on the opposite end wall of the container adjacent its upper portion while the oil outlet tube 36 is mounted on the bottom wall adjacent the rear end as more clearly shown in Figure 8.

The filtering member 77 in this instance however, is formed in substantially pyramidal shape, having its apex disposed in axial alignment with the inlet tube 72 but spaced inwardly from the adjacent end of the latter. The closed end or nose 78 is rounded slightly and the walls 79, of which there are four, each extend rearwardly therefrom in a long gradual outwardly curved manner terminating in plane extending transversely inwardly from the end of the container and engageable respectively with the adjacent walls of the latter as more clearly shown in Figure 9. The filtering member is secured against displacement in any suitable manner and the walls 79 are provided with perforations similar to those heretofore described in connection with the filtering member 47. With this arrangement the incoming fluid is divided into four swirling streams, causing the oil particles to be deposited upon the filtering member where they pass through the perforations and trickle down the inner surface to the bottom of the container.

Figure 11:
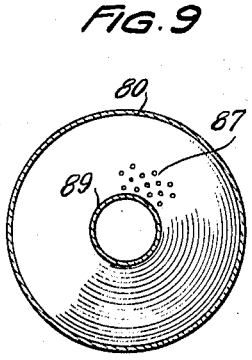
Figure 11 is a transverse sectional view taken along line 11—11 in Figure 10.
Figure 10:
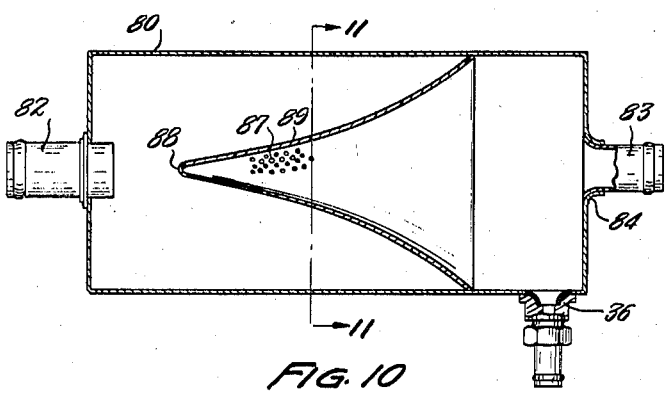
Figure 10 is a longitudinal vertical sectional view of a further modified form of separator embodying the invention.

A further modification, illustrated in Figures 10 and 11, shows a fluid tight container 80, of circular shape in cross-section, having an inlet tube 82 suitably mounted in an opening provided in the forward end wall and in this instance on its longitudinal axis. An air outlet tube 83 is mounted in a flanged opening 84 provided on the opposite end wall of the container and in this instance in axial alignment with the inlet tube 82. The filtering member 87, in the present showing however, is formed in substantially conical shape, having its apex disposed in axial alignment with the inlet tube 82 but spaced inwardly from the adjacent end of the latter. The closed end or nose 88 is rounded slightly and the wall 89 extends rearwardly therefrom in a long gradual outwardly curved manner terminating in a plane extending transversely inwardly from the end of the container and engageable with the inner peripheral portion of the latter as more clearly shown in Figure 11. The filtering member is secured in any suitable manner and the wall is provided with perforations similar to those heretofore described in connection with the filtering member 47. With this arrangement the incoming fluid is changed into an annular shaped swirling stream causing the oil particles to be deposited upon the filtering member where they pass through the perforations and trickle down the inner surface to the bottom of the container.

It will be obvious, from the modifications shown, that the broad feature of the invention may be embodied in the formation of filtering members differently shaped from that shown in Figures 1 and 2. The important object is to form a filtering member which has maximum filtering area where the weights and sizes of the oil separator are to be maintained at a minimum and, in the present instance, the shapes of the filtering members illustrated provide approximately fifty per cent greater area than that shown in my prior patent heretofore referred to. This results in more rapid separation making it possible to handle a greater quantity of fluid. The increased area of the filtering member further reduces the relative velocity of the introduced oil ladened air and by positioning the closed end of the filtering member in axial disposition with respect to the inlet tube and having the sides extend rearwardly in a long gradual outwardly curved manner the back pressure also is materially reduced. It should be further understood that while the filtering members are shown specifically in connection with definitely shaped containers they are nevertheless interchangeable and the positions of the air outlet openings may be likewise changed without effecting the efficiency of the separator which is exceptionally desirable from the installation standpoint.

It is not believed necessary to enter into a detailed description of the operation of the oil separator due to the rather elaborate description heretofore. It will be sufficient to say that the incoming oil ladened air discharged under pressure from the vacuum pump enters the tube 32 and is discharged from the inner end into contact with the closed end of the filtering member 41. The fluid is divided into two relatively lateral swirling streams by reason of the curved walls 49 and the latter due to its large area reduces the velocity of the streams. This allows the oil particles to adhere to the filtering member where they pass through the perforations and trickle down the vertical side walls of the filtering member onto the bottom of the container where the inclination of the bottom wall causes the oil to flow toward the oil discharge outlet. The swirling action imparted to the incoming oil ladened air tends to separate the oil particle and clarifies the air. The substantially oil freed air, which also passes through the perforations, is then forced out under pressure through the air outlet opening 30 where it is conveyed to the de-icer apparatus or in the event the latter is not in use to the slip stream. The separated oil passes outwardly through the discharge opening where it is conveyed by a suitable conduit to the engine crank-case or other reservoir.

While I have described the preferred embodiment of the invention it is to be understood that I am not to be limited thereto inasmuch as changes and modifications may be resorted to without departing from the spirit of the invention as defined in the appended claims.

What is claimed is:

1. An oil separator for use on aircraft or the like, for separating oil from oil ladened air comprising: a closed elongated container having an inlet port on one end thereof through which oil ladened air may be introduced under pressure and having at the other end thereof an air outlet port for the discharge under pressure of oil freed air; a relatively thin sheet material baffle member disposed transversely within said container for dividing the latter into a first compartment containing said inlet port and a second compartment containing said outlet port, said baffle member being formed with a hollow closed end and relatively long gradually curved diverging side walls disposed perpendicularly to and extending between the top and bottom of the container, said baffle member extending from adjacent said inlet port to adjacent said outlet port, the closed end of said baffle member being disposed in a perpendicular plane centrally with respect to said inlet port but in closely spaced relation whereby the incoming oil ladened air is divided into a plurality of swirling streams, said walls being perforated transversely to permit the flow of oil and air therethrough, the oil particles adhering to the wall surfaces and flowing downwardly to the bottom of said second compartment, the separated air flowing into said second compartment and being discharged under pressure through the outlet port, said walls affording relatively large surfaces so disposed with respect to the incoming oil ladened air that the velocity of the latter is materially reduced to effect separation of the oil and air without appreciable pressure loss; and means in communication with said second compartment to afford drawing off the separated oil.

2. An oil separator for use on aircraft or the like, for separating oil from oil ladened air comprising: a closed elongated container having an inlet port on one end thereof through which oil ladened air may be introduced under pressure and having at the other end thereof an air outlet port for the discharge under pressure of oil freed air; a relatively thin sheet material baffle member disposed transversely within said container for dividing the latter into a first compartment containing said inlet port and a second compartment containing said outlet port, said baffle member being formed with a hollow closed end and relatively long gradually curved diverging side walls disposed perpendicularly to and extending between the top and bottom of the container, said baffle member extending from adjacent said inlet port to adjacent said outlet port and rigidly secured by being brazed or welded along its opposite edges to the adjacent top and bottom walls respectively, the closed end of said baffle member being disposed in a perpendicular plane centrally with respect to said inlet port but in closely spaced relation whereby the incoming oil ladened air is divided into a plurality of swirling streams, said walls being perforated transversely to permit the flow of oil and air therethrough, the oil particles adhering to the wall surfaces and flowing downwardly to the bottom of said second compartment, the separated air flowing into said second compartment and being discharged under pressure through the outlet port, said walls affording relatively large surfaces so disposed with respect to the incoming oil ladened air that the velocity of the latter is materially reduced to effect separation of the oil and air without appreciable pressure loss; and means in communication with said second compartment to afford drawing off the separated oil.

3. An oil separator for use on aircraft or the like, for separating oil from oil ladened air comprising: a closed elongated container having an inlet port on one end thereof through which oil ladened air may be introduced under pressure and having at the other end thereof an air outlet port for the discharge under pressure of oil freed air; a relatively thin sheet material baffle member disposed transversely within said container for dividing the latter into a first compartment containing said inlet port and a second compartment containing said outlet port, said baffle member being formed with a hollow closed end and relatively long gradually curved diverging side walls of substantially pyramidal shape, said baffle member extending from adjacent said inlet port to adjacent said outlet port, the closed end of said baffle member being disposed axially with respect to said inlet port but in closely spaced relation whereby the incoming oil ladened air is divided into a plurality of swirling streams, said walls being perforated transversely to permit the flow of oil and air therethrough, the oil particles adhering to the wall surfaces and flowing downwardly to the bottom of said second compartment, the separated air flowing into said second compartment and being discharged under pressure through the outlet port, said walls affording relatively large surfaces so disposed with respect to the incoming oil ladened air that the velocity of the latter is materially reduced to effect separation of the oil and air without appreciable pressure loss; and means in communication with said second compartment to afford drawing off the separated oil.

4. An oil separator for use on aircraft or the like, for separating oil from oil ladened air comprising: a closed elongated container having an inlet port on one end thereof through which oil ladened air may be introduced under pressure and having at the other end thereof an air outlet port for the discharge under pressure of oil freed air; a relatively thin sheet material baffle member disposed transversely within said container for dividing the latter into a first compartment containing said inlet port and a second compartment containing said outlet port, said baffle member being formed with a hollow closed end and a relatively long gradually curved outwardly flared wall of substantially conical shape, said baffle member extending from adjacent said inlet port to adjacent said outlet port, the closed end of said baffle member being disposed axially with respect to said inlet port but in closely spaced relation whereby the incoming oil ladened air is divided into a swirling stream, said walls being perforated transversely to permit the flow of oil and air therethrough the oil particles adhering to the wall surfaces and flowing downwardly to the bottom of said second compartment, the separated air flowing into said second compartment and being discharged under pressure through the outlet port, said walls affording relatively large surfaces so disposed with respect to the incoming oil ladened air that the velocity of the latter is materially reduced to effect separation of the oil and air without appreciable pressure loss; and means in communication with said second compartment to afford drawing off the separated oil.

JAMES P. JOHNSON.